United States Patent [19]
Fages

[11] Patent Number: 5,518,567
[45] Date of Patent: May 21, 1996

[54] PROCESS FOR THE PRODUCTION OF A COMPOSITE MATERIAL PART CONSTITUTED BY A CENTRAL BODY AND AILERONS

[75] Inventor: Jacques Fages, Bagnolet, France

[73] Assignee: Aerospatiale Societe Nationale Industrielle, Paris, France

[21] Appl. No.: 265,725

[22] Filed: Jun. 24, 1994

[30] Foreign Application Priority Data

Jun. 30, 1993 [FR] France .................................. 93 07981

[51] Int. Cl.$^6$ ............................. B32B 5/00; B65H 81/00; F42B 10/04
[52] U.S. Cl. .......................... 156/175; 156/173; 156/174; 156/181; 244/3.24
[58] Field of Search ........................... 156/169, 172–175, 156/180, 189, 191, 192, 193; 244/3.24, 34 A, 35 R

[56] References Cited

U.S. PATENT DOCUMENTS

| | | | |
|---|---|---|---|
| 4,710,412 | 12/1987 | Darrieux ................................. | 428/36 |
| 5,200,012 | 4/1993 | Blavignac ............................... | 156/173 |
| 5,362,344 | 11/1994 | Ben-Porat et al. ..................... | 156/172 |

FOREIGN PATENT DOCUMENTS

| | | |
|---|---|---|
| 0104186 | 8/1980 | European Pat. Off. . |
| 2565159 | 5/1984 | France . |
| 2556650 | 6/1985 | France . |
| WO92/20503 | 11/1992 | WIPO . |

Primary Examiner—Daniel J. Stemmer
Attorney, Agent, or Firm—Finnegan, Henderson, Farabow, Garrett & Dunner

[57] ABSTRACT

A process for producing a composite material part having a central hollow body with edge ailerons extending outwardly therefrom in which peripheral mandrels 1 are joined and a peripheral mandrels 1 then being turned round and pressed against a central mandrel 16 on which another filament has been wound. The filaments are impregnated and polymerized to form the desired part.

8 Claims, 4 Drawing Sheets

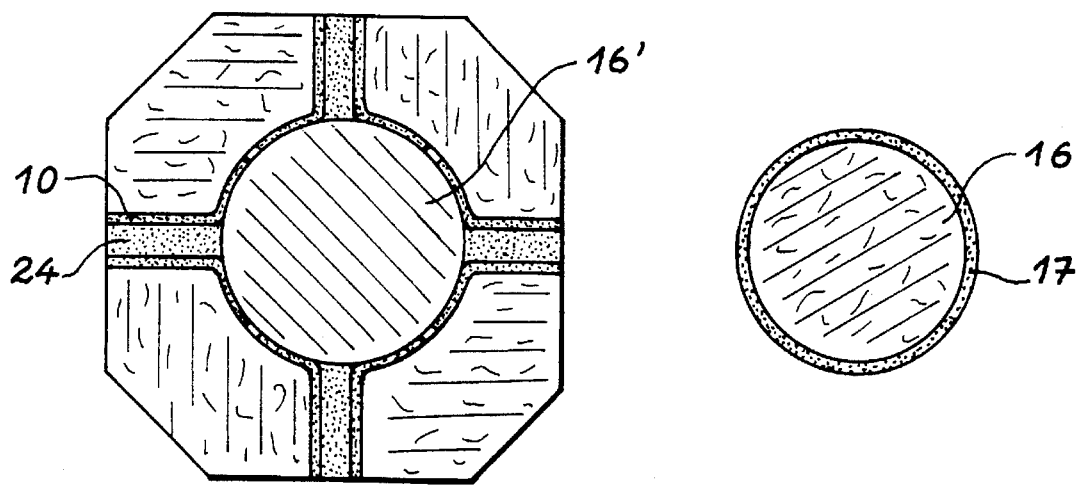
FIG. 6A
FIG. 6B
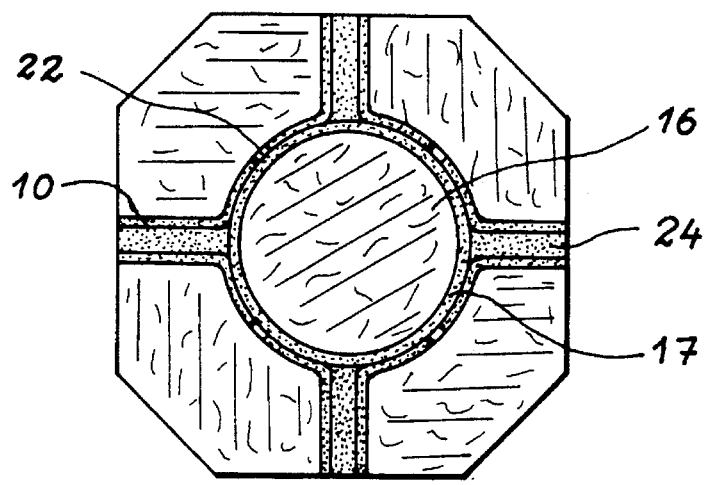
FIG. 7

PROCESS FOR THE PRODUCTION OF A COMPOSITE MATERIAL PART CONSTITUTED BY A CENTRAL BODY AND AILERONS

DESCRIPTION

The invention relates to a process for the production of a composite material part formed by a central body provided with ailerons and which can be a missile structure.

Composite materials are widely used in aeronautics due to their lightness. Another advantage is that they avoid the machining operations necessary for the formation and assembly of certain parts, if the latter are made from metal. Therefore French patents 2 565 159 and 2 556 650 respectively describe the way of manufacturing a complex structure by winding filaments constituting the framework of the material around mandrels having a simple shape, followed by the cutting off of the winding and assembling the parts obtained by cutting and how to produce a part like that of the present invention. It can be gathered from reading these patents that the specific methods for the processing of the composite materials are complicated to implement for certain types of parts and e.g. the stretch forming of composite material sheets around a shaping body of an aileron requires delicate manual operations.

According to the invention, the process for the production of the part is improved and simplified compared with French patent 2 556 650. Thus, as in the aforementioned patent, it comprises a stage of winding a filament-around a central mandrel having a shape similar to that of the cavity of the central body in order to constitute the latter, but which is characterized in that it also comprises the stages of:

regrouping peripheral mandrels in a number equal to the ailerons and provided in each case with two mutual contact faces, a fitting face to the central body and two fitting faces to the ailerons which connect the fitting face to the central body to respectively one of the mutual contact faces, in assemblies where the mutual contact faces are Joined in pairs and where the fitting faces form for each assembly a continuous surface which is closed on itself, winding a filament around the assemblies, cutting the windings around the assemblies where the mutual contact faces are joined, separating the assemblies and pressing the peripheral mandrels on the central mandrel, the fitting faces to the central body facing the central mandrel and the fitting faces to the ailerons facing one another in pairs, and, in per se known manner, impregnation of the filament and polymerization of the impregnated material.

Thus, a synthetic, thermosetting product impregnates the filament in order to constitute the complimentary material of the composite, which will then be polymerized to form a solid body. The impregnation may have already been carried out when the filament is on the reel (it is then called a preimpregnate), but it can also take place after the formation of the winding, as is well known in the art (the filament then being called dry).

It is possible to reinforce the ailerons by having stages of winding a filament around at least one oblong mandrel, cutting the winding in order to draw strips therefrom and interposing the strips between the fitting faces to the ailerons when said faces face one another.

At least in certain circumstances, it is advantageous to adhere counter-forms on the fitting faces to the central body in order to form projections between the fitting faces to the ailerons when the filament is wound on the assemblies and then withdraw said counter-forms when the peripheral mandrels are pressed onto the central mandrel. This arrangement is of interest in the standard case where the central body is cylindrical and where the fitting faces are concave. The winding is then stretched above the fitting face, between the edges defining it, so that it has a smaller surface. When pressing takes place on the central mandrel, the winding is forced to the bottom of the fitting faces to the body, which makes it necessary to slit it beforehand and involves a groove being formed on the central body, which is weakened. This disadvantage is avoided if the projections have an equivalent surface to that of the fitting faces.

The invention is described in greater detail hereinafter relative to embodiments and the attached drawings, wherein:

FIGS. 6A, 6B & 7 show a further mandrel assembly and pressing procedure therefor.

Figure 1:
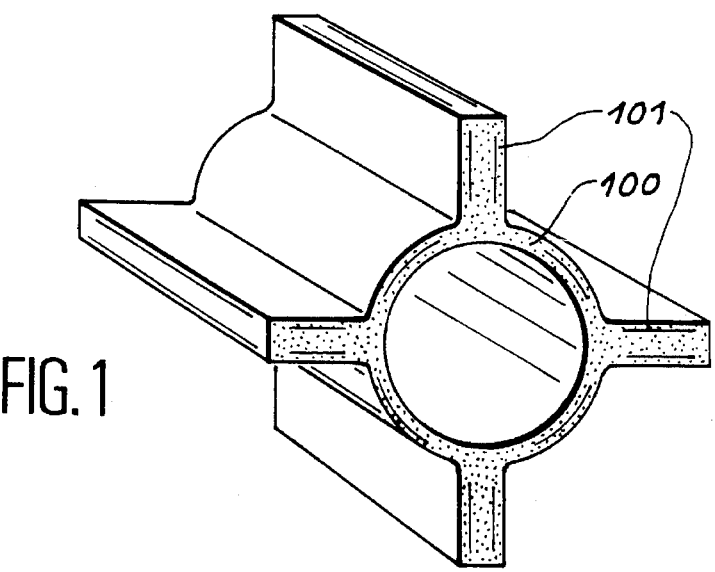
FIG. 1 is part to be obtained.

The part of FIG. 1 is a missile structure constituted by a cylindrical central body 100 around which extend four ailerons 101 arranged at right angles and joined to the central body 100 at an edge thereof.

Figure 2A:
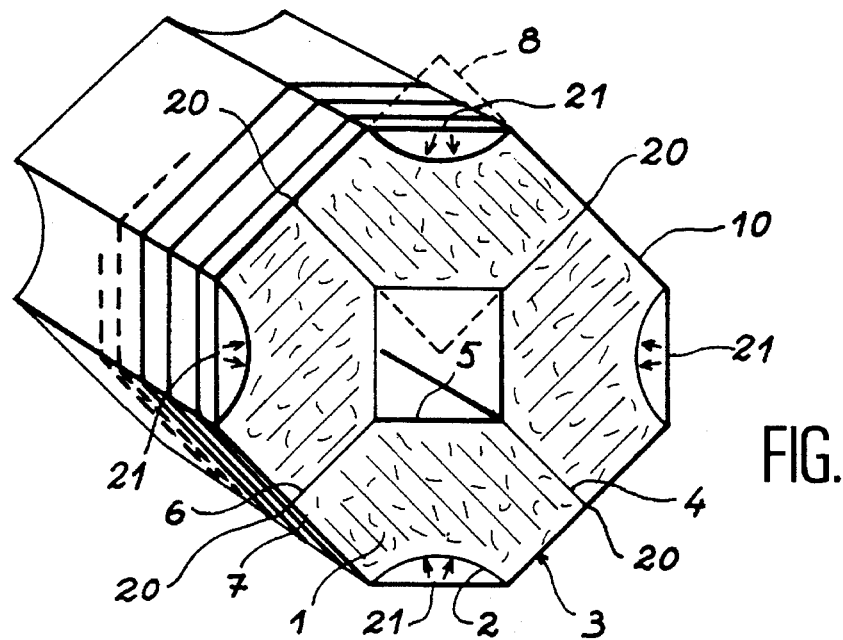
FIGS. 2A, 2B, 2C and 2D show the essential tooling elements for implementing an embodiment of the invention.

FIG. 2A shows a first tooling element comprising an assembly of four peripheral mandrels 1, each in the form of an irregular hexagon and whose periphery succcessively comprises a fitting face 2 to the central body, a first fitting face 3 to the ailerons, a first mutual contact face 4, a pressing face 5, a second mutual contact face 6 and a second fitting face 7 to the ailerons. The fitting face 2 to the central body is in the form of a concave circular arc and the others are straight. The mutual contact face 4 of all the peripheral mandrels 1 is Joined to the other mutual contact face 6 of another of the peripheral mandrels 1. One of the fitting faces 3 on all the peripheral mandrels 1 extends contiguously from the other fitting face 7 of another of the peripheral mandrels 1. Moreover, the fitting faces 3 and 7 and the mutual contact faces 4, 6 of each of the peripheral mandrels 1 form the sides of a virtual parallelepiped 8 having a square section, the non-existing side portions thereof being shown in broken line form. The pressing faces 5 define an unoccupied volume in the center of the assembly.

A winding is made around the assembly and carries the reference numeral 10. It adheres to the fitting faces 3 and 7 to the ailerons and is stretched over the fitting faces 2 to the central body. It is therefore shape like an isosceles octagon having straight and irregular sides.

Figure 2B:
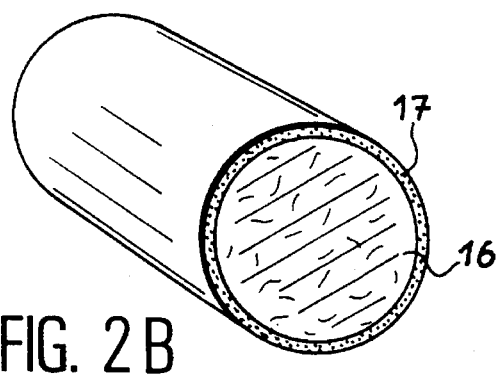
Figure 2C:
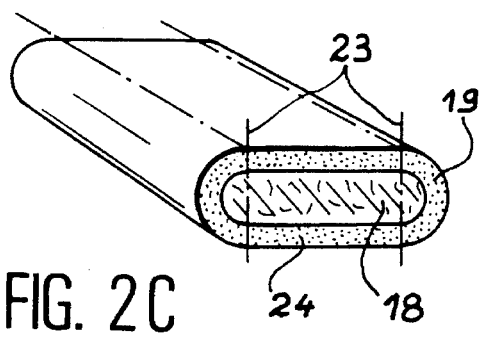
Figure 2D:
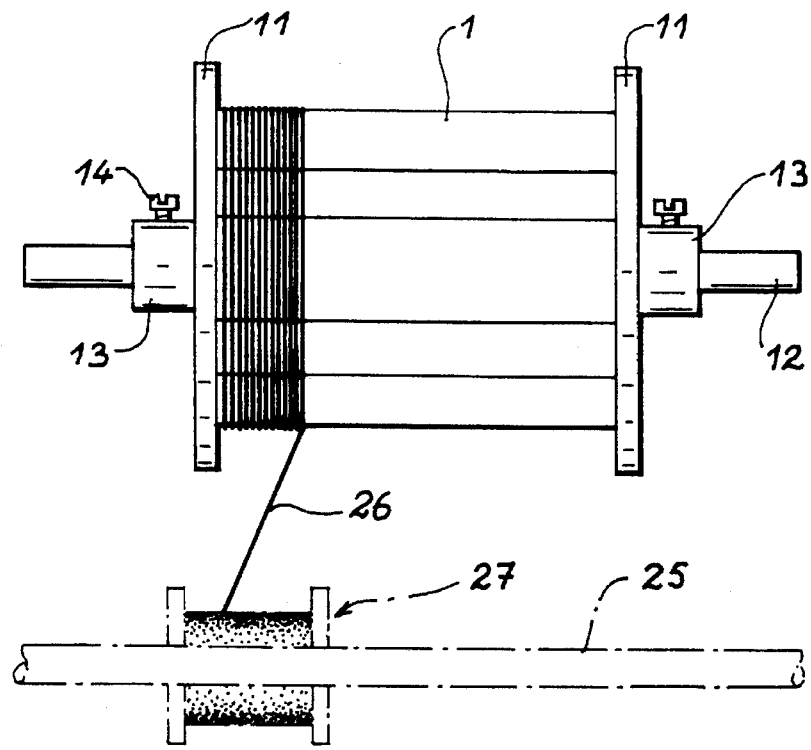

FIG. 2D shows that the assembly can be produced by securing the previously Juxtaposed peripheral mandrels 1 between two flanges 11, threaded onto a spindle 12, as well as two slides 13, each of which has a setscrew 14, on the spindle 12 to maintain the peripheral mandrels 1 axially secured between the flanges 11. Mortise and tenon systems between the peripheral mandrels 1 and the flanges 11 can make it possible to obtain a perfect assembly. The winding 10 is produced by a filament 26 or a fiber forming the framework of the composite material of the part to be produced and which is initially wound on a reel 27 sliding on a second spindle 25 parallel to the spindle 12. The rotation of the spindle 12 draws the filament 26 and the translation of the reel 27 brings about the adjustment of the winding 10 between the two flanges 11.

The tooling elements also comprises (FIGS. 2B and 2C) a cylindrical central mandrel 16 about which is made a winding 17 and an oblong mandrel 18, which has a rectangular section and which is very flat, except at the ends which are rounded and around which is made a winding 19 for producing the ailerons 101. The windings 17 and 19 can be produced in the same way as the winding 10 by unwinding filament from a reel and after installing flanges at the ends of the mandrels 16 and 18.

Figure 3:
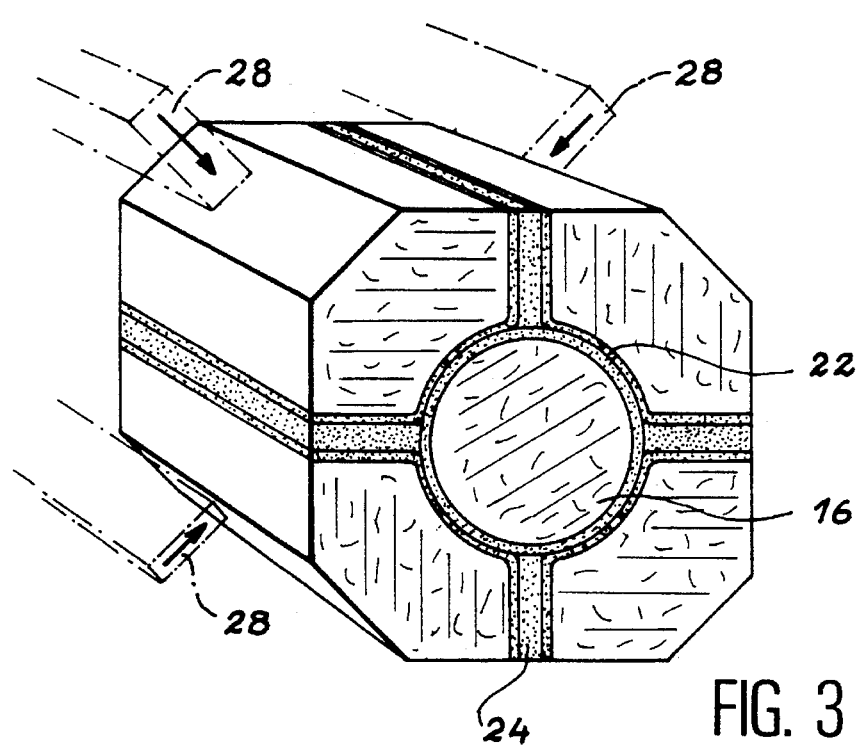
FIG. 3 shows a pressing procedure for obtaining the part of FIG. 1.

We will now return to FIG. 2A. The remainder of the process consists of slitting or cutting the winding 10 at eight locations along longitudinal lines: at the junctions 20 of the peripheral mandrels 1, where the mutual contact faces 4, 6 are joined and in front of the centers 21 of the fitting faces 2 to the body. The peripheral mandrels 1 are then detached, turned round and their fitting faces 2 pressed onto the central mandrel 16, the radius of curvature of which is substantially equal to the radius of the central mandrel 16, increased by the thicknesses of the windings 10 and 17. The portions of the winding 10 which were stretched over the fitting faces 2 are consequently forced open by the windings 17 on the mandrel 16 until they are moulded against the fitting faces 2 and each of the slits produced at the locations 21 produces a longitudinal groove 22 on the central body 100 in front of each of the peripheral mandrels 1 (FIG. 3).

As shown in FIG. 2C, winding 19 of the ailerons is cut into strips along the large flat sides of the oblong mandrel 18, e.g. by cuts 23 close to the ends, in order to obtain cores 24 intercalated between portions of the winding 10, which are bonded to the fitting faces 3 and 7 of the mandrels 1. The cores 24 make it possible to freely choose the thickness of the ailerons 101, but remain optional. Pressing takes place by jacks 28 (or by hooping the threads), which bear on the pressing faces 5 and force the peripheral mandrels 1 in concentric directions towards the center of the central mandrel 16.

The assembly and compacting of the different windings 10, 17 and 19 ensure the cohesion of the central body 100 and the ailerons 101 as a result of the solidification of the impregnation during the polymerization of the composite material, which takes place during pressing, after which the peripheral mandrels 1 and the central mandrel 16 are removed. The extraction of the latter causes no problem, because its expansion coefficient is much greater than that of the composite material, so that it is detached from the central body 100 by contracting more than the latter when cooled.

Figure 4:
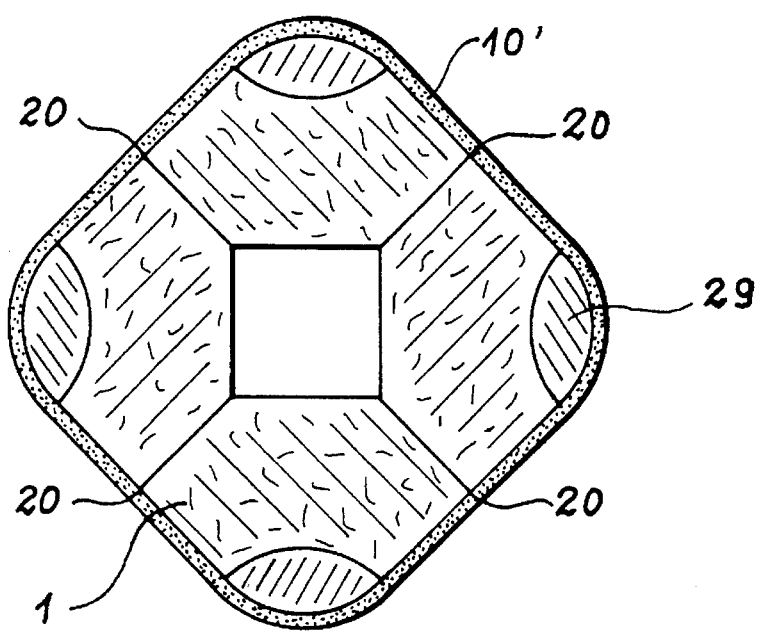
FIG. 4 shows an alternative assembly of the mandrels.
Figure 5:
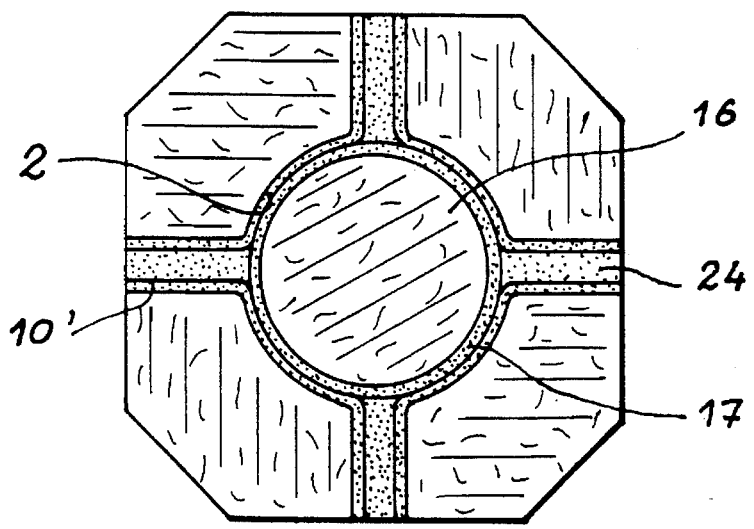
FIG. 5 shows the pressing procedure for the assembly of FIG. 4.

An improvement to the process is shown in FIG. 4 and more particularly relates to the assembly of the peripheral mandrels 1, which is completed compared with FIG. 2A by slightly bonding filling counter-forms 29 to the fitting faces 2 of the mandrels. The cross section of the counter-forms 29 is defined by two circular arcs and the peripheral winding 10' adapts to the shape of an assembly without concavity; a square with the rounded angles. The filling counter-forms 29 project over the assembly. The assembly of the peripheral mandrels 1 with the central mandrel 16, identical to that of FIG. 3, is shown in FIG. 5 and involves beforehand removing the filling counter-forms 29 and cutting the peripheral winding 10' at the junctions 20 of the peripheral mandrels 1, but not at the locations 21 of FIG. 2A. The portions of the peripheral winding 10' which were wound over the filling counter-forms 29 fit exactly within the fitting faces 2 when the assembly of the mandrels 1 and 16 takes place. Thus, there is no longitudinal groove 22 and the central body 100 is smooth in this case.

Another variant of the process usable in combination with one or other of the two preceding variants consists of producing and polymerizing the central winding 17 (FIG. 6B) independently of a first assembly and pressing sequence illustrated in FIG. 6A during which the peripheral winding 10 or 10' is pressed between a second central mandrel 16' of slightly larger diameter than that of the first central mandrel 16 and the fitting faces to the central body 2. The polymerization of the winding 10 or 10' and the cores 24 takes place at this time. The second central mandrel 16' is then replaced by the first central mandrel 16 coated with the central winding 17. A supplementary polymerization takes place to solidify the adhesive deposited between the windings 10 or 10' and 17 during said second assembly sequence and the part is then complete.

A situation with four ailerons 101 and four peripheral mandrels 1 is shown. If the peripheral mandrels 1 must be identical in number to the ailerons, this number can optionally differ from four. One solution consists of constructing a central body with six ailerons and six peripheral mandrels 1, which are assembled in two assemblies of three peripheral mandrels according to FIGS. 2A and 4. Other variants are clearly possible on the basis of this principle.

I claim:

1. A process for the production of a composite material part comprising a hollow central body having edge ailerons extending outwardly therefrom, said process comprising:

winding a filament around a central mandrel having a shape corresponding to that of the hollow central body;

providing a number of peripheral mandrels, each peripheral mandrel including two mutual contact faces for contacting adjacent peripheral mandrels, a first fitting face for fitting to the central mandrel, and second and third fitting faces for forming at least part of the ailerons, said second and third fitting faces connecting the first fitting face to the mutual contact faces, the number of peripheral mandrels being equal to the number of ailerons;

forming an assembly of said peripheral mandrels by grouping together said peripheral mandrels such that the mutual contact faces of each adjacent mandrel are joined in pairs and the fitting faces form a continuous surface which is closed on itself;

winding a filament around the assembly;

cutting the winding around the assembly along lines where the mutual contact faces are joined;

separating the peripheral mandrels;

pressing the first fitting face of each peripheral mandrel against the winding around the central mandrel such that the second and third fitting faces, which form at least part of the ailerons, of each peripheral mandrel face each other in pairs;

impregnating the filaments with a polymerizable material and polymerizing the impregnated filaments to form said part;

and removing the central and peripheral mandrels from said part.

2. The process of claim 1 comprising an additional step of winding a filament around an oblong mandrel, cutting said winding around said oblong mandrel to form flat strips, and interposing the flat strips between each pair of second and third fitting faces which strips form at least part of the ailerons when said second and third fitting faces face each other in pairs.

3. The process of claim 1, wherein the filaments are impregnated after being wound on the central mandrel and assembly of peripheral mandrels.

4. The process of claim 1, wherein the filaments are impregnated before being wound on the central mandrel and assembly of peripheral mandrels.

5. The process of claim 1, wherein counterforms are placed on each first fitting face that bulge out between the second and third fitting faces before the filament is wound on the assembly of peripheral mandrels, said counterforms being removed before the first fitting faces of the peripheral mandrels are pressed against the winding around the central mandrel.

6. The process of claim 1, wherein the impregnated filaments wound around the central mandrel and the assembly of peripheral mandrels are polymerized separately after the peripheral mandrels have been separated from each other, the first fitting face of each peripheral mandrel then being pressed against and bonded to the winding around the central mandrel.

7. The process of claim 1, wherein the impregnated filaments are polymerized during the pressing of the first fitting faces of each peripheral mandrel against the winding around the central mandrel.

8. The process of claim 1, wherein each of the peripheral mandrels have a pressing face connecting the two mutual contact faces that is opposite from the first fitting face.

* * * * *

UNITED STATES PATENT AND TRADEMARK OFFICE
CERTIFICATE OF CORRECTION

PATENT NO. : 5,518,567
DATED : May 21, 1996
INVENTOR(S) : Jacques Fages

It is certified that error appears in the above-indentified patent and that said Letters Patent is hereby corrected as shown below:

On the Title page, item [57];

ABSTRACT, line 4, insert --filament winding is formed around them and then cut, the-- before "peripheral".

Claim 7, column 6, line 10, delete "the" before "pressing".

Signed and Sealed this

Twenty-fourth Day of December, 1996

*Attest:*

BRUCE LEHMAN

*Attesting Officer*     *Commissioner of Patents and Trademarks*